A. B. UNDERWOOD.
CLAMP.
APPLICATION FILED MAR. 30, 1915.
1,217,539. Patented Feb. 27, 1917.
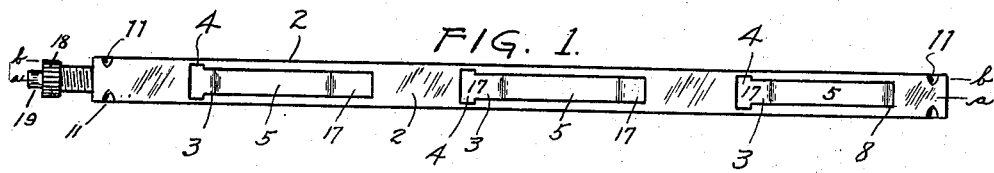
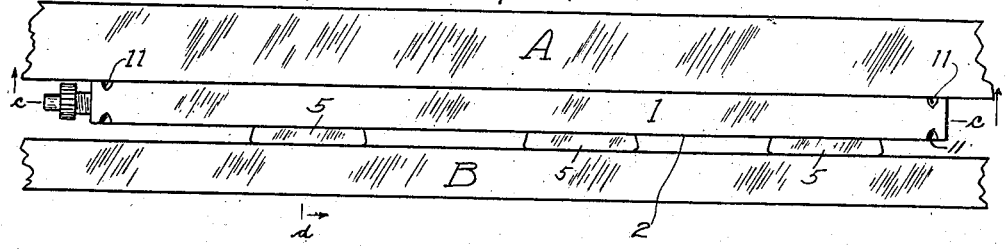
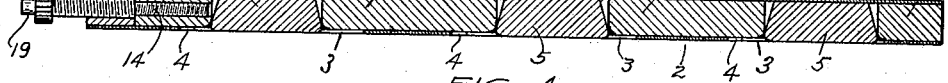
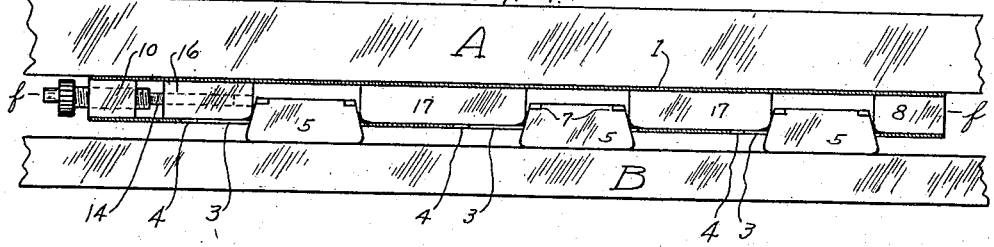
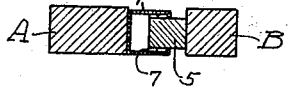
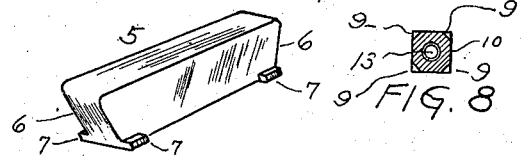
WITNESSES
C. E. menefee
Berl Rigdon
INVENTOR
Albert B. Underwood
by John Elias Jones,
ATTORNEY.

UNITED STATES PATENT OFFICE.

ALBERT B. UNDERWOOD, OF CINCINNATI, OHIO, ASSIGNOR TO BOHUMILA UNDERWOOD, OF CINCINNATI, OHIO.

CLAMP.

1,217,539.        Specification of Letters Patent.        Patented Feb. 27, 1917.

Application filed March 30, 1915. Serial No. 18,184.

*To all whom it may concern:*

Be it known that I, ALBERT B. UNDERWOOD, a subject of the King of Great Britain, and a resident of Cincinnati, in the county of Hamilton and State of Ohio, have invented a certain new and useful Improvement in Clamps, of which the following is a specification.

This invention relates to clamps or quoins used in connection with printers' chases or forms in the final alinement or adjustment and locking-up of the composed type-matter to be held therein, and the object of the invention is to provide a clamp or quoin composed of a tubular body-portion of rectangular cross-section, elongated slots or openings made in succession along one face of said tubular body-portion, self-alining clamp or wedge blocks movably inserted in said body-portion and adapted to be extended forwardly through said elongated openings or slots in the clamping or wedging process of use of the device, sliding filler or extension blocks between the said wedge-blocks in the tubing, suitable plugs fitted and held in the opposite ends of the tubing, and a double-acting propelling-screw that carries a traveling nut or push-block at its inner end which is adapted to slide said filler or extension blocks lengthwise within the tubing and simultaneously divert or force said wedge-blocks laterally or outwardly through the slots in the tubing for exerting clamping-pressure between a pair of walls or elements that are to be assembled or held together in an accurately adjusted manner for use and readily disassembled when the clamped-chase or locked-up form is to be parted when out of use.

The details of the invention will be fully hereinafter described and particularly pointed out in the claims.

In the accompanying sheet of drawings:—

Figure 1 is a longitudinal elevation showing the fore-side or the near, active clamping-face of the quoin embodying my invention herein, but with the parts as they appear in normal position when out of use and ready for insertion and adjustment in a chase or the like for use;

Fig. 2, a plan view of my clamp or quoin showing it in active clamping-position for use in the frame of a printer's chase or form, the frame and inner bar or stick of such chase being shown broken off adjacent both ends of the clamp;

Fig. 3, an axial-section of the clamp or quoin, taken on the line *a, a*, of Fig. 1;

Fig. 4, a plan view similar to Fig. 2 but with the clamp or quoin made in longitudinal section, taken on the line *b, b*, of Fig. 1, but, also, with the device in clamped or locking relation;

Fig. 5, an axial, longitudinal section, taken on the line *c, c*, of Fig. 2 and line *f, f* of Fig. 4, but omitting the frame of the chase or form;

Fig. 6, a transverse section taken on the line *d, d*, of Fig. 2 that includes the clamp or quoin in locked position between the outer frame-bar and the inner bar or stick of a chase or the like;

Fig. 7, a detached perspective view of my special form of wedge or clamp blocks; and—

Fig. 8, a transverse section of my special form of plug used in the fore-end of the clamp or quoin for containing within its threaded bore the main or larger threaded portion of the double-acting or right and left threaded screw that is used for feeding or forcing the wedge blocks or clamps outwardly from within the tubing of the quoin into clamping-position.

1 indicates the body portion of my device, the same being a metal tubing of square cross-section and having in its fore or active clamping-face 2 a series of elongated openings or slots 3 duly spaced apart and, also, spaced from the opposite ends of the tubing, as best seen in Figs. 1 and 3, wherein the quoin is shown in its normal condition when out of use and at rest. The slots 3 are each widened or expanded at one end thereof, as shown at 4 in connection with each one of the three, as disclosed in Figs. 1, 3 and 4, the purpose of each being hereinafter duly referred to and forming an important feature in connection with the structure and assembling of my invention herein.

5 indicates each one of a series of three movable clamping-blocks, whose opposite ends are tapered or sloped inwardly toward each other, as best shown at 6, 6 in Fig. 7, and also shown in Figs. 2, 3 and 4 whereby such blocks are made to take the form of lopped-off or truncated wedges whose base portions or faces are disposed outwardly in the slots 3, such outer faces lying normally flush with the outer face 2 of the tubing, as best seen in Fig. 3, and thus being in position ready for immediate clamping use when forced outwardly by the means that I shall presently describe. The said clamping or wedge blocks 5 are, however, preferably provided with laterally-extending lugs 7 at their opposite inner corners, such lugs being adapted to freely enter or pass through the widened or laterally-notched ends 4 of the slots 3 when it is desired to place the clamp or wedge blocks within the tubing 1, or for removing the same therefrom, as occasion may require. Said lugs 7 extend within the tubing beyond the upper and lower edges of the slots 3 so that the clamp wedge-blocks cannot escape from said tubing.

8 indicates a plug fitted and rigidly held within the rear-end of the tubing 1 and provided with notches or dents in its four longitudinal edges (between its opposite ends) in the same manner as are provided the notches or dents 9 shown in the plug or block 10 in Fig. 8, such block 10 being fitted and held in the opposite or fore end of the tubing, as best seen in Figs. 3, 4 and 5. Said notches or dents 9 are made in the plugs 8 and 10 for receiving the dents or impressions 11 that are subsequently made in the opposite ends of the tubing, so that they seat and are made to readily register therein by means of a suitable tool or compression device that is set in a predetermined proper place, the said dents 11 being best shown in Figs. 1 and 2 and forming important and substantial means of securing said plugs in a very cheap and ready manner at the opposite ends of the tubular-body 1.

A double-acting screw is mounted with its larger portion 12 engaging a threaded-bore 13 made in the plug 10 and has an inner smaller or reduced portion 14 that is provided with a left-hand screw-thread for engagement with a similarly threaded-bore 15 made in a traveling nut or block 16 within the tubular body-portion 1, the bore 15 being in axial-alinement with the bore 13 of the end-plug 10, and the plug 10 and traveler 16 being in contact with each other, with the double-acting screw in the position seen in Fig. 3 at the time said plug 10 and traveler 16 are inserted for use in the fore-end of the tubular body-portion 1 ready for the indentations 11 to be made in the tubing for fastening said end-plug 10 securely in place and whereby the larger threaded-portion 12 can reciprocate or be turned so as to move back and forth in the end-plug 10 for advancing the traveler 16 forwardly into the tubular body-portion 1 or retreating it therefrom, to be further advanced or afterward retreated in the tube 1 by means of the integral screw 14 which is of about half the diameter of the threaded-portion 12 and has a left-hand or reverse thread that serves to properly advance the traveler 16 when the portion 12 advances in the plug 10 and at an augmented speed, and similarly retreats the traveler for releasing the clamp after use. The traveler 16 is somewhat elongated and of greater length than that of the end plug 10 and fills the space between the inner end of said plug 10 and the next adjacent clamping or wedge block 5, as shown in Figs. 3, 4 and 5, whereby an ample threaded-bore is provided for the smaller screw shank 14, to allow for the proper lengthwise-movement of said traveler in extending or projecting the clamping-blocks 5 into the desired position for action.

17 indicates each one of two filler-blocks or independent movable pusher-extensions provided between the middle clamping-block 5 and the clamping-blocks 5 at the opposite ends of the tubing 1. These pusher-extensions are made to fit, free to slide, within the tubing 1 and have straight opposite ends at right-angles to their outer faces, with the opposite outer corners duly rounded so that the beveled or sloped ends of the clamping-blocks 5 shall ride or slide freely without undue friction or resistance into and out of clamping-engagement. The opposite outer corners of said clamping-blocks are also rounded instead of being sharp or angular so as to more freely aline with the face of the adjacent bar or stick B, the latter being the inner one of the chase or form that has an outer frame A, as customary.

The wedge-blocks 5 are self-alining and have sufficient lengthwise-movement in the slots 3, with their opposite sloping-ends in engagement with the rounded outer-corners of the pusher-extensions or fillers 17 and the rounded outer-corners of the outer-block 8 and the traveler 16, whereby any undue diversion or deflection of the bar or stick B from a parallel relation with frame-bar A is readily compensated for and results in the true locking-up of the composition within the chase. The locking or clamping operation is very easily accomplished by means of a spring-ratchet wrench whose handle is arranged at a right-angle to that of the double-acting screw 12, 14, the part 12 of such screw having at its outer-end a toothed-collar 18 and an axial-extension 19, the latter being adapted to be engaged by an eye at the inner end of the wrench and the teeth of said collar 18 being adapted to be successively engaged by the spring-ratchet of such wrench when the handle of the tool is rocked back and forth to turn said double-acting screw in either direction for putting the clamp or quoin into or out of use as the case may be.

In assembling the quoin, the plug 8 is first inserted and secured in the outer end of the tubing 1; then a wedge-block 5 is inserted by passing its lugged opposite ends through the enlarged or notched part 4 of the slot 3, (to the right-hand,) so that the right-hand end of the wedge contacts with the rounded inner-corner of the said plug 8, such rounded inner-corner of the plug extending slightly beyond the adjacent end of the slot 3, as best shown in Figs. 1 and 3; then a filler or pusher-extension 17 is inserted in the tubing through its inner end, (to the left,) until it contacts with the said first-placed wedge-block 5, with its its outer round-corner just back of the adjacent round-corner of said wedge-block; then the middle wedge-block 5 is inserted through the enlarged part 4 of the middle slot 3, the same as the first-placed wedge-block, until the said second-placed wedge-block contacts with the said filler 17 and with the rounded-corner of the latter slightly to the rear of the rounded-corner of said second-placed wedge-block; then the next filler or pusher-extension 17 is inserted through the inner end, (to the left,) of the tubing until one of its ends abuts the said second-placed or middle wedge-block; then the next and last wedge-block 5 is inserted through the enlarged portion 4 of the slot 3 (to the left) the same as the two previous wedge-blocks 5, until one of its ends contacts with the said second-named filler or pusher-extension 17; and then the plug 10, together with the traveler 16 assembled in contact on the double-acting screw, as shown in Fig. 3, is inserted in the tubing through the inner end (to the left) thereof, until the outer-end of said plug 10 is flush with the end of the tubing, at which time the dents 11 are made or impressed in the outer edges of the tubing so as to seat into or interlock with the notches 9 that are made in said block 10, whereby the plug is securely fastened in the tubing and permits the double-acting screw to turn back and forth therein for due action on the traveler 16 in propelling or extending the wedges 5 outwardly through the slots and the pusher-extensions lengthwise forwardly within the tubing to transmit motion to the middle and the first-placed wedge-blocks for projecting them outwardly through their slots in the clamping-operation and for contact with the adjacent face of the bar or stick B when the back of the tubing 1 has been placed in position, in flat contact, against the inner face of the frame-bar A, as best seen in Figs. 2 and 4. The outer corner of the traveler 16 is rounded so as to permit the free riding or sliding of the adjacent sloped end of the innermost wedge-block 5 when being placed into and out of clamping position.

It is obvious that the device can be used for other clamping purposes than in a printer's chase or form and a like effective result attained.

When the parts of the quoin are once placed within the tubing they cannot be withdrawn or become accidentally disengaged or lost, the lugs 7 preventing the wedges from disengagement through the slots and the wedges themselves preventing removal of the intermediate fillers 17. When the double-acting screw is at rest, as shown in Figs. 1 and 3, the traveler 16 is in contact with the end-plug 10 and such screw being oppositely threaded in its two lengths 12 and 14 that respectively engage the said plug 10 and traveler 16, it is locked in place against further movement outwardly and cannot, therefore, become disengaged or lost, but it can, of course, be turned forwardly so as to move forwardly in the plug 10 and simultaneously move the traveler 16 forwardly in contact with the first wedge 5 that at once begins to move outwardly through its slot until it contacts with the bar B, and then the next adjacent filler 17 advances so as to force the next wedge 5 outwardly until it contacts with said bar B, and then the next filler 17 advances so as to force the last wedge, (to the right,) outwardly until it contacts with the bar B, at which time the clamping-operation is completed with that particular quoin, but subject to ready adjustment in connection with other quoins used in the chase or form to suit the desired arrangement or position of the composition within the said chase.

It is obvious that instead of notching the four edges of the plug 10, as shown in Fig. 8, a lesser number of the edges can be notched in one or more places, and even one notch can be provided in said plug for the seating of a dent or impression made in the tubing to coincide with such single notch and thereby hold the plug in position, but the plugs in the opposite ends of the tubing would not be held quite so secure as when made with the dents around the entire four edges, especially when a clamping-engagement of considerable force or pressure is to be depended on in the action of the device.

It will be observed that the clamping or wedge blocks really form or constitute quoins proper, and the tubing forms a convenient carrier or holder that has pressure-applying devices therein for forcing said wedge-blocks laterally in self-alined or duly adjusted clamping-engagement in printers' forms and other purposes needing compensating-adjustment when in the act of being assembled and locked into working-condition for use.

I claim:—

1. A quoin or clamping device comprising a tubular body-portion having elongated slots in due succession along one face thereof, clamping blocks or wedges adapted to slide within said tubular body-portion and having sloping or beveled opposite ends, intermediate fillers or pusher-extensions between the wedges, lateral lugs provided at the opposite inner ends or corners of said clamping blocks or wedges and adapted to retain the latter within said tubing, lateral notches made in each of said slots at one end thereof and adapted to the ready insertion of the lugged-ends of said clamping-blocks, a plug secured in the outer end of the tubing, a plug having a threaded-bore longitudinally made therein and held within the opposite end of said tubing, a traveler nut or block within the tubing between said last-named plug and the next-adjacent clamping-block and having a longitudinal bore therein that is oppositely threaded to that of the said last-named plug, and a double-acting screw having reverse threads provided thereon and made of two diameters the larger of which engages the said last-named plug and the smaller of which engages the said traveler-nut, whereby the forward-movement of the said double-acting screw propels the said clamping-blocks and the said fillers forwardly and extends said clamping-blocks outwardly into pressing clamping-engagement with the parts to be locked or firmly held into position for use.

2. In a quoin, the combination of a tubular body-portion having one or more elongated openings or T-shape slots made in one face thereof, one or more clamping blocks or wedges having sloping or tapered opposite ends and adapted to be projected through said T-shape slots, fillers or pusher-extensions arranged between pairs of said wedges, plugs in the opposite ends of the tubing provided initially with notches or dents in one or more of the longitudinal edges thereof and adapted to receive or seat dents or impressions made in the tubing so as to register therewith and to hold or secure the plugs in the tubing against removal or displacement, and means adapted to engage one of said plugs for advancing or propelling the said clamping-members and the fillers in effecting the outward-movement of said wedges into clamping-position.

3. In a printer's quoin, an elongated clamping wedge-block having parallel, plane front and rear faces and with its opposite plane ends tapered or sloping rearwardly and toward each other so that said front face is longer than the rear one and, also, having stop-lugs projecting laterally from its four rear corners but on the sides only of the wedge.

4. In a printer's quoin, a clamp-propelling device comprising a rigid block having a longitudinally screw-threaded bore, a movable-block or traveler-nut having a bore of lesser diameter than that of the first-named block and oppositely screw-threaded, and a double-acting screw having one part thereof of large diameter adapted to engage a large threaded-bore of the first-named block and with a portion of lesser diameter having an oppositely-threaded screw-formation thereon adapted to engage the internal thread of said traveler-nut, whereby the said traveler-nut can be propelled forwardly by both parts of the screw in an accelerated manner and likewise retreated to and from engagement with a clamping-device.

ALBERT B. UNDERWOOD.

Witnesses:
JOHN ELIAS JONES,
BERL RIGDON.